United States Patent [19]

Reinshagen

[11] Patent Number: 4,681,629

[45] Date of Patent: Jul. 21, 1987

[54] POWDER METALLURGICAL PROCESS FOR MANUFACTURING COPPER-NICKEL-TIN SPINODAL ALLOY ARTICLES

[75] Inventor: John H. Reinshagen, North Huntingdon, Pa.

[73] Assignee: Pfizer Inc., New York, N.Y.

[21] Appl. No.: 811,140

[22] Filed: Dec. 19, 1985

[51] Int. Cl.$^4$ .............................................. B22F 1/00
[52] U.S. Cl. ....................... 75/246; 419/26; 419/29; 419/38; 419/57; 419/60; 148/12.7 C
[58] Field of Search .................. 419/29, 36, 37, 38, 419/26, 57, 60; 148/11.5 C, 11.5 P, 12.7 C, 126.1; 75/247

[56] References Cited

U.S. PATENT DOCUMENTS

| | | | |
|---|---|---|---|
| 4,373,970 | 2/1983 | Scorey et al. | 419/37 |
| 4,525,325 | 6/1985 | Livak | 148/11.5 C |
| 4,591,482 | 5/1986 | Nyce | 419/38 |
| 4,594,217 | 6/1986 | Samal | 419/29 |

Primary Examiner—Stephen J. Lechert, Jr.
Attorney, Agent, or Firm—Charles J. Knuth; Peter C. Richardson; Lawrence C. Akers

[57] ABSTRACT

Discrete copper-nickel-tin spinodal alloy articles, such as bearings, containing from about 5 to about 35 wt. % nickel, from about 4 to about 13 wt. % tin and the balance copper are produced by processing a prealloyed alloy powder to form a green body having substantially the desired shape of, and proportionally sized to, the final article and sintering the green body in a reducing atmosphere or a vacuum at a temperature of at least 1650° F. for sufficient time to achieve at least 90% of the theoretical density. The green body may be formed by either compaction or injection molding of the prealloyed powder. The resulting sintered article may be age hardened to effect a spinodal decomposition of the copper-nickel-tin alloy. The age hardened articles exhibit excellent strength properties and homogeneity while retaining significant ductility.

13 Claims, No Drawings

POWDER METALLURGICAL PROCESS FOR MANUFACTURING COPPER-NICKEL-TIN SPINODAL ALLOY ARTICLES

BACKGROUND OF THE INVENTION

Copper-base alloys are well-known materials of construction for discrete alloy parts, for example bushings, bearings, and structural parts. It is known to manufacture such copper-base alloy parts by powder metallurgical methods involving the sintering of green bodies having substantially the desired shape of, and proportionally sized to, the final article. Thus, for example, U.S. Pat. No. 2,301,721 discloses the manufacture of a composite floor product article by sintering equal volumes of an abrasive material and a metal bond together, preferably at about 800° C. for 5 hours, with the metal bond being a mixture of copper, nickel and tin elemental powders, and U.S. Pat. No. 3,453,103 discloses the manufacture of alloy articles by sintering at 760° C. to 830° C. for 15 to 60 minutes green compacts made by compaction of a mixture of copper (balance), nickel (4.5 to 5.5 wt. %), tin (7 to 8 wt. %) and graphite (0.25 to 4 wt. %) elemental powders.

U.S. Pat. No. 4,373,970 discloses powder metallurgical processes for preparing stock material of indefinite length (strip, sheet, rod, wire, etc.) of a copper-nickel-tin spinodal alloy containing from about 5 to 35 wt. % nickel, from about 7 to 13 wt. % tin and the balance copper. The preferred powder metallurgical process disclosed in this patent includes the steps of compacting a prealloyed or elemental powder to a green form, sintering the green form at a temperature of from about 1200° F. to 1900° F. for at least about one minute, cooling the sintered strip at a rate sufficient to prevent age hardening and embrittlement, cold working the cooled sintered material to a substantially fully dense final gage, and annealing the cold worked material and quenching it at a rate sufficient to retain substantially all alpha phase. Although this process has been used with considerable success in the commercial manufacture of Pfinodal ® copper-nickel (15 wt. %)-tin (8 wt. %) strip (Pfizer Inc.; New York, N.Y.), a product with an excellent combination of strength, formability, ductility and electrical conductivity characteristics, its adaptability to the manufacture of discrete alloy parts (e.g. bearings and bushings) has heretofore been uncertain, principally because of the fact that full densification is typically not achieved in powder metallurgical discrete parts manufacture.

SUMMARY OF THE INVENTION

It is an object of the present invention to provide a powder metallurgial process for preparing discrete copper-base spinodal alloy articles having good strength and good ductility characteristics. This and other objects of the invention are achieved with a novel powder metallurgical process which comprises the steps of:

(a) providing a prealloyed copper base alloy powder containing from about 5 to about 35 percent by weight nickel, from about 4 to about 13 percent by weight tin, and the balance copper; (b) compacting the alloy powder to form a green body having structural integrity, sufficient porosity to be penetrated by a reducing atmosphere or a vacuum and substantially the desired size and shape of said article; and (c) sintering the green body in the reducing atmosphere or a vacuum at a temperature of at least 1650° F. for a sufficient time to form a metallurgical bond and achieve a post-sinter alloy body density which is from 90 to 96 percent of the theoretical density of said alloy body. Preferably, said prealloyed copper base alloy powder contains from about 6 to about 15 percent by weight nickel and from about 4 to about 8 percent by weight tin.

An important key to the success of the process of the invention set forth above is the extensive sintering step, which is continued until a post-sinter alloy body density of from 90 to 96 percent of the theoretical density is achieved. As used herein, the term "post-sinter alloy body density" refers to the density of the alloy body after it has been sintered and subsequently cooled to room temperature. Preferably, the sintering step (c) in the novel process set forth above is conducted at a temperature of from about 1700° F. to about 1800° F. for at least about 30 minutes.

After sintering and cooling, the article may optionally be subjected to spinodal decomposition, i.e. age hardened, to improve its strength properties (including transverse rupture, 0.2% offset yield and ultimate tensile strengths). The age hardened articles exhibit excellent strength properties and homogeniety, while retaining (unless the age hardening treatment is excessive) significant ductility. Thus, although the age hardening treatment decreases ductility, it is readily feasible by the practice of the present invention to obtain ultimate tensile strengths of at least about 90 ksi and transverse rupture strengths of at least about 180 ksi while retaining a ductility of at least 2 percent elongation at break.

Thus, the scope of the present invention also includes a novel article of manufacture comprising a discrete age hardened copper base alloy part prepared by powder metallurgy, with said alloy containing from about 5 to about 35 percent by weight nickel, from about 4 to about 13 percent by weight tin, and the balance copper, and said part having a density of from 90 to 96 percent of the theoretical density of the part, a transverse rupture strength of at least about 180 ksi, an ultimate tensile strength of at least about 90 ksi and a percent elongation at break of at least 2 percent.

DETAILED DESCRIPTION OF THE INVENTION

As used herein the term "spinodal alloy" refers to an alloy whose chemical composition is such that it is capable of undergoing spinodal decomposition. An alloy that has already undergone spinodal decomposition is referred to as an "age hardened spinodally decomposed alloy", a "spinodally hardened alloy", or the like. Thus, the term "spinodal alloy" refers to alloy chemistry rather than alloy physical state and a "spinodal alloy" may or may not be at any particular time in an "age hardened spinodally decomposed" state.

The novel article of manufacture of the present invention comprises a discrete age hardened alloy part prepared by powder metallurgy, with the alloy containing copper, nickel and tin as essential ingredients. The alloy may optionally contain small amounts of additional elements as desired, e.g. iron, magnesium, manganese, molybdenum, niobium, tantalum, vanadium, aluminum, chromium, silicon, zinc and zirconium in amounts of up to about 0.5 percent by weight each and not to exceed a total of about 2 percent by weight, as long as the basic and novel characteristics of the alloy are not materially affected in an adverse manner thereby.

The starting material in the process of the present invention is a prealloyed alloy powder containing appropriate proportions of copper, nickel and tin. Preferably the prealloyed powder particles are of irregular shape, such as are produced by water atomization, because irregularly shaped particles when compacted together afford green bodies with high green strength. More preferably, the particle size distribution of the prealloyed powder starting material is such that essentially all of the powder is of smaller than 100 U.S. Standard mesh size (corresponding to a particle size of less than 150 microns) and at least about 20 percent by weight of the powder is of smaller than 325 U.S. Standard mesh size (corresponding to a particle size of less than 45 microns). Prior to compaction the prealloyed powder may be blended with up to about 1 weight percent (based on the weight of the powder) of a lubricant such as lithium stearate, zinc stearate or a paraffin wax such as Acrawax C to minimize die wear and improve the resulting green density.

The prealloyed alloy powder (optionally blended with a lubricant) is compacted, e.g. in a die, to form a green body having substantially the desired size and shape of the final article and sufficient structural integrity to withstand further processing. The compacted green body must have sufficient porosity to be penetrated by a reducing atmosphere or a vacuum during the subsequent sintering step, but preferably has a density of at least about 70 percent of the theoretical density to insure high green body strengths and high post-sinter densities. The compaction pressure is preferably at least about 10 tons per square inch (tsi) and more preferably at least about 50 tsi. A preferred green body density range is from about 80 percent to about 90 percent of the theoretical density.

If a lubricant has been blended with the prealloyed alloy powder starting material it should preferably be removed from the green body prior to sintering by heating the green body at an elevated temperature, but below the sintering temperature, for a sufficient time (e.g. about 30 minutes at about 950° F.) to remove the lubricant, followed by either cooling to room temperature or heating to the sintering temperature.

As noted earlier, an appropriately extensive sintering operation is essential to process the compacted green body into an article of manufacture having the highly desirable properties described herein. Thus, the compacted green body is sintered in a reducing atmosphere (e.g. dissociated ammonia or hydrogen) or a vacuum at a temperature of at least 1650° F. for a sufficient time to form a metallurgical bond between particles and achieve a post-sinter alloy body density of from 90 to 96 percent of the theoretical density of the alloy body. The upper limit of this range is so recited because it appears to be very difficult to attain higher post-sinter densities in the process under discussion; the lower limit is selected at 90 percent because articles having lower densities lack the desired combination of mechanical properties described herein. As a general rule, the sintering temperature should be increased as the nickel content of the alloy is increased and/or the tin content is decreased. Also, it is usually preferred that the sintered body be cooled at such a rate, i.e. at least about 100° F. per minute, through the age hardening range of the alloy that age hardening and embrittlement are avoided. In general, the sintered body can be cooled either to room temperature, or to the age hardening temperature. It is useful to note that an appropriate controlled cooling operation from the sintering temperature would allow a desired age hardening to occur during cooling, and eliminate the need to perform a distinct subsequent age hardening treatment. In any event, there is no need to perform a separate post-sinter annealing operation to achieve desired mechanical properties.

Age hardening the sintered alloy article to improve its strength properties may be carried out at a temperature of from about 500° F. to about 1000° F. for at least about 15 seconds. The duration of the age hardening spinodal decomposition operation should be carefully selected and controlled. The age hardening process proceeds in sequence through three time periods, i.e., the underaged time range, the peak strength aging time range and, finally, the overaged time range. The duration of these three phases will of course vary as the age hardening temperature is varied, but the same general pattern prevails. The strength properites of the age hardened spinodally decomposed alloy of the present invention are highest in the peak strength aging range and lower in the underaged and overaged ranges, while the ductility of the alloy tends to progressively decrease as the peak strength aging time range is approached. The optimum age hardening time will depend upon the combination of mechanical properties sought for the alloy part being prepared, but will usually be within the peak strength aging range. Sometimes, especially when a high ductility is of particular importance, the optimum age hardening time will be within the first half of the peak strength aging time range or within the underaged time range. When operating within the underaged time range a substantial "trade-off" between ductility and strength properties must typically be accepted.

For purposes of definition, the peak strength aging time for a particular alloy at a particular age hardening temperature is that precise time of age hardening at which the yield stress of the spinodal hardened alloy is at its maximum value.

Finally, the scope of the present invention also includes a variation of the novel process discussed heretofore, in which a green body having substantially the desired shape of, and proportionally sized to, the article being produced is prepared by injection molding rather than compaction. By using a prealloyed alloy powder of such a particle size distribution that at least about 80 percent by weight of the alloy powder is of smaller than 500 U.S. Standard mesh size, and blending this very fine alloy powder with a binding agent prior to injection molding, this process variation can be used to prepare discrete alloy articles having a post-sinter alloy body density that approaches very closely to the theoretical density.

EXAMPLES 1 to 8

A prealloyed alloy powder (produced by water atomization) having a composition of 77 wt. % copper-15 wt. % nickel - 8 wt. % tin and a particle size distribution of 100% less than 100 U.S. Standard mesh size: 75 to 80 wt. % less than 325 U.S. Standard mesh size was used as the starting material. This alloy powder was blended in a laboratory V-blender with lithium stearate lubricant (5 parts by weight lubricant per 1000 parts by weight alloy powder), and the resulting mixture was compacted at a pressure of 48 tsi into a number of Metal Powder Industries Federation (MPIF) Standard 10 flat tension test and MPIF Standard 41 transverse rupture test specimens. These specimens all had a density of 85 to 86 percent of the theoretical density. The green body specimens were then heat treated for about 30 minutes at about 950° F. in a simulated dissociated ammonia (DA) atmosphere in a laboratory tube furnace for lubricant removal purposes and rapidly cooled to room temperature.

The samples were then sintered for about 1 hour at about 1770° F. in a simulated DA atmosphere in a laboratory tube furnace and rapidly cooled in a water jacketed cooling zone of the furnace. Certain of the samples were subjected to an age hardening heat treatment at various different temperatures in a simulated DA atmosphere in a laboratory tube furnace and subsequently cooled to room temperature; in each case the duration of the age hardening heat treatment was about 2 hours.

The resulting samples were tested for 0.2 percent offset yield strength, ultimate tensile strength and percent elongation at break (all from the MPIF Std. 10 samples) and for transverse rupture strength (from the MPIF Std. 41 samples). The results of Table I were obtained. These results are unexpectedly favorable in view of the significant departure from the theoretical density.

TABLE I

| Ex. No. | Aging Temp. (°F.)** | Aged Density (% of Theoretical) | Transverse Rupture Strength (ksi) | Yield Strength (ksi) | Ultimate Tensile Strength (ksi) | Elongation at Break (%) |
| --- | --- | --- | --- | --- | --- | --- |
| 1 | Unaged | 93.0 | 135 | 43 | 69 | 15 |
| 2 | 650° | 92.3 | 160 | 58 | 75 | 5* |
| 3 | 700° | 93.9 | 180 | 72 | 99 | 2 |
| 4 | 725° | 95.3 | 195 | 72 | 111 | 4 |
| 5 | 750° | 93.4 | 206 | 81 | 111 | 1 |
| 6 | 775° | 92.8 | 176 | 74 | 84 | ca. 0 |
| 7 | 800° | 92.5 | 182 | —*** | 90 | ca. 0 |
| 8 | 825° | 92.4 | 166 | 58 | 83 | ca. 0 |

*result from one sample only. All other data in table are averages from at least duplicate samples.
**age hardening treatment of about 2 hours.
***not determined.

I claim:

1. A process for preparing a discrete copper-base spinodal alloy article which comprises the steps of:
    (a) providing a prealloyed copper base alloy powder containing from about 5 to about 35 percent by weight nickel, from about 4 to about 13 percent by weight tin, and the balance copper;
    (b) compacting the alloy powder to form a green body having structural integrity, sufficient porosity to be penetrated by a reducing atmosphere or a vacuum and substantially the desired size and shape of said article; and
    (c) sintering the green body in the reducing atmosphere or a vacuum at a temperature of from about 1700° F. to about 1800° F. for at least about 30 minutes to form a metallurgical bond and achieve a post-sinter alloy body density which is from 90 to 96 percent of the theoretical density of said alloy body.

2. A process of claim 1 wherein the density of the green body is at least about 70 percent of the theoretical density of said body.

3. A process of claim 2 wherein the density of the green body is from about 80 percent to about 90 percent of the theoretical density of said body.

4. A process of claim 1 comprising additionally the step of cooling the sintered body at a rate such that age hardening and embrittlement are prevented.

5. A process of claim 1 comprising additionally the step of age hardening the sintered body.

6. A process of claim 4 comprising additionally the step of age hardening the sintered body at a temperature of from about 500° F. to about 1000° F. for at least about 15 seconds.

7. A process of claim 6 wherein the duration of the age hardening treatment is approximately equal to the peak strength aging time of the alloy at the age hardening temperature.

8. A process of claim 6 wherein the duration of the age hardening treatment is less than the peak strength aging time of the alloy at the age hardening temperature.

9. A process of claim 1 wherein said alloy powder contains from about 6 to about 15 percent by weight nickel, from about 4 to about 8 percent by weight tin, and the balance copper.

10. A process of claim 1 wherein said alloy powder contains about 15 percent by weight nickel, about 8 percent by weight tin, and the balance copper.

11. A process of claim 1 wherein said alloy powder contains about 7.5 percent by weight nickel, about 4.5 percent by weight tin, and the balance copper.

12. An article of manufacture comprising a discrete age hardened copper base alloy part prepared by powder metallurgy, said alloy containing from about 5 to about 35 percent by weight nickel, from about 4 to about 13 percent by weight tin, and the balance copper, and said part having a density of from 90 to 96 percent of the theoretical density of the part, a transverse rupture strength of at least about 180 ksi, an ultimate tensile strength of at least about 90 ksi and a percent elongation at break of at least 2 percent.

13. An article of manufacture of claim 12 wherein said alloy contains about 15 percent by weight nickel, about 8 percent by weight tin, and the balance copper.

* * * * *